July 25, 1939.     L. FERENCI     2,167,108
BREAD SLICER
Filed Aug. 20, 1935     3 Sheets-Sheet 1
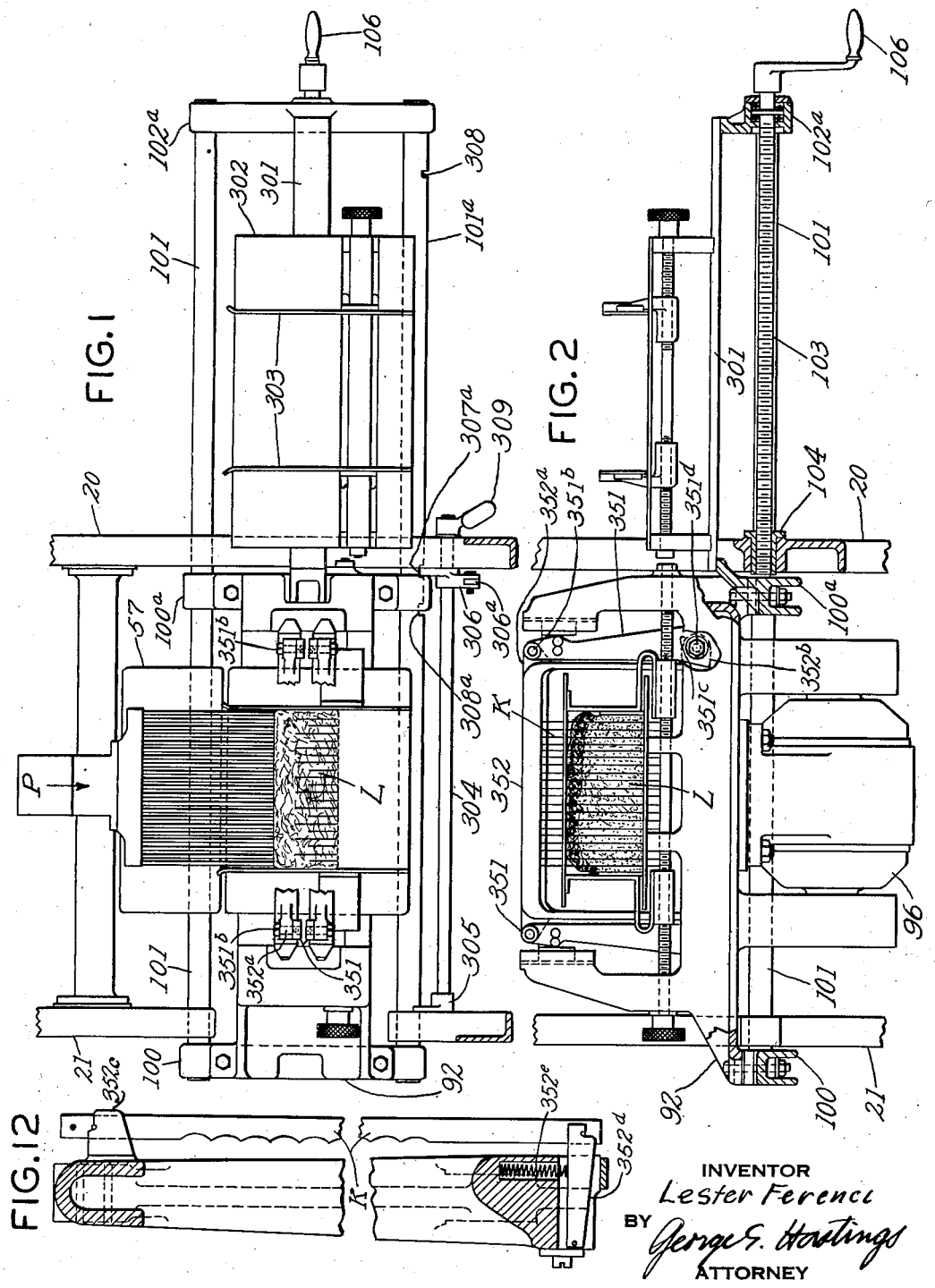
INVENTOR
Lester Ferenci
BY George G. Hastings
ATTORNEY

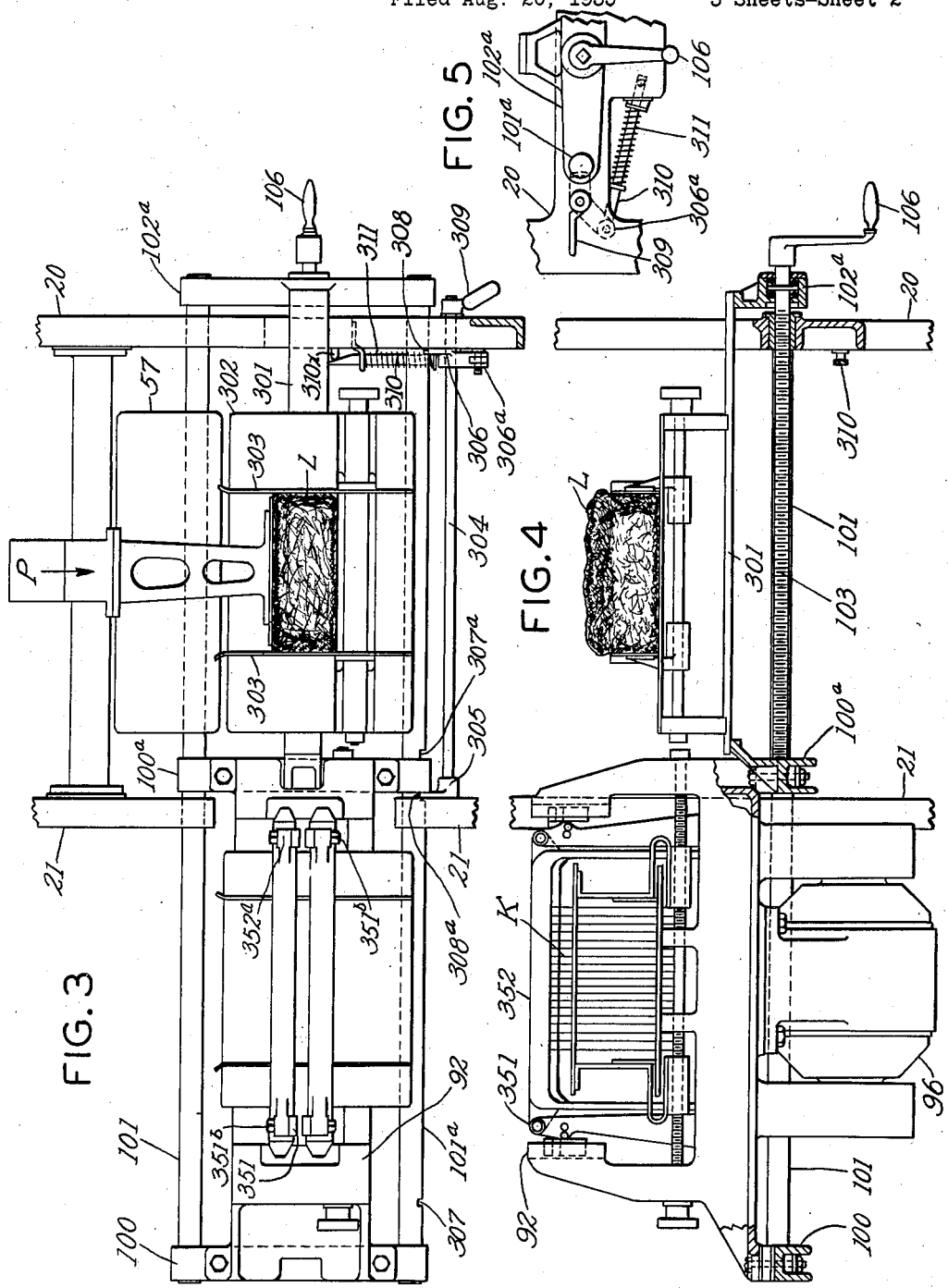

July 25, 1939.  L. FERENCI  2,167,108
BREAD SLICER
Filed Aug. 20, 1935  3 Sheets-Sheet 3
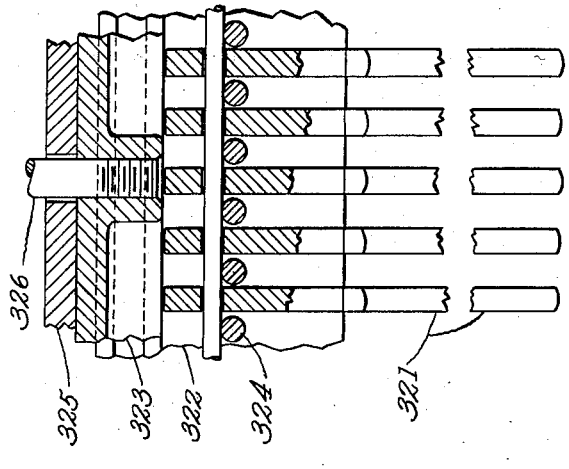
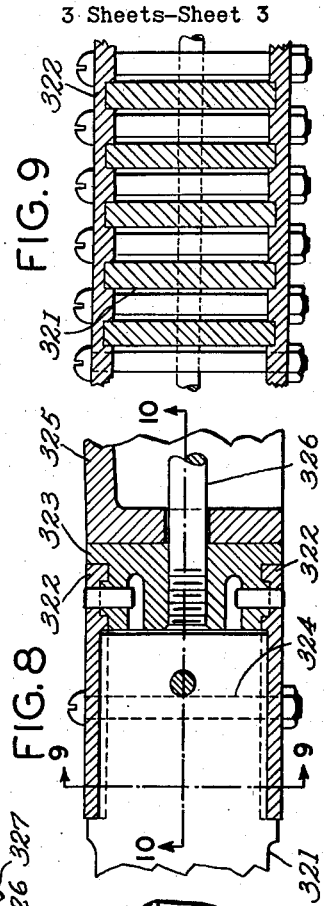
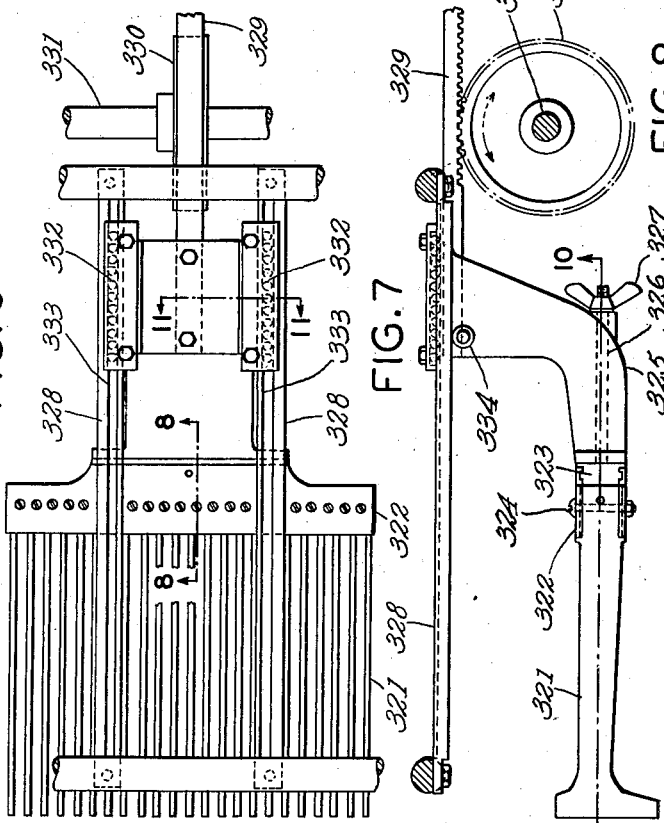
INVENTOR
Lester Ferenci
BY George S. Hastings
ATTORNEY Patented July 25, 1939

2,167,108

UNITED STATES PATENT OFFICE 2,167,108

BREAD SLICER

Lester Ferenci, Brooklyn, N. Y., assignor to American Machine & Foundry Company, a corporation of New Jersey Application August 20, 1935, Serial No. 36,950

16 Claims. (Cl. 146—153)

This invention relates to an improved bread slicing attachment for wrapping machines, more particularly to bread slicing and wrapping machines such as disclosed in my co-pending application No. S. N. 594,101, filed Feb. 19, 1932, now Patent No. 2,082,945 issued June 8, 1937.

The present application constitutes a continuation in part of my application S. N. 704,988, filed January 2, 1934, for a Bread slicer.

The main object of the invention is to provide simple mechanical means, whereby the slicer unit can be conveniently and speedily moved out of operative position and a table be automatically substituted in its place when it is desired to change from sliced to unsliced loaf wrapping.

This object is accomplished by mounting the slicer unit in the same manner as disclosed in my co-pending application referred to above and by mounting a permanent table on a platform carried by the overhanging portion of the frame which serves as a support for the slicer unit. Thus, whenever the slicer is moved out of operative position the transfer table automatically takes its place.

Another important object of the invention is to provide for greater accessibility of the slicer for changing blades and for changing whole sets of blades mounted in detachable blade frames for different widths of slices. To this end the invention contemplates movable mounting of the slicer so that the same may be disassembled or disassociated with respect to the adjacent and overlying feed and wrapping machine parts, such as shown in the application S. N. 594,101 above referred to. By so doing the changing of individual blades or blade frames is greatly facilitated.

With these and other objects not specifically mentioned in view, the invention consists in certain constructions and combinations hereinafter fully described and then specifically set forth in the claims hereunto appended.

In the accompanying drawings, wherever the same or parts similar to those of said co-pending application are used, they are given the same reference numbers, reference being made to said Patent No. 2,082,945 for a more complete disclosure of the slicer unit:

Fig. 1 is a plan view showing the invention with the slicer unit in operative position;

Fig. 2 is a side elevation of Fig. 1 shown partly in section;

Fig. 3 is a plan view showing the invention with the slicer unit in non-operative position and the table in operative position;

Fig. 4 is a side elevation of Fig. 3;

Fig. 5 is a detail view of the device for locking the frame supporting the slicer unit, when the slicer unit is in either operative or non-operative position;

Fig. 6 is a detail plan view of the loaf pusher for advancing the loaves through the slicer;

Fig. 7 is a side elevation of Fig. 6;

Fig. 8 is a section on line 8—8 of Fig. 6 shown on an enlarged scale;

Fig. 9 is a sectional view on line 9—9 of Fig. 8;

Fig. 10 is a detail section on line 10—10 of Figs. 7 and 8;

Fig. 11 is a detail section on line 11—11 of Fig. 6 shown on an enlarged scale; and Fig. 12 is a sectional view in side elevation showing a detail of the blade frame.

In carrying the invention into effect in accordance with the embodiment selected for illustration there is provided a pusher adapted to advance a loaf of bread sidewise, a slidable frame movable transversely of the path of said pusher, a slicer unit and table mounted on said frame, mechanism for moving said frame, whereby the slicer unit or table may be moved into operative relation to the loaves advanced by the pusher, and means for locking said frame with the slicer unit or table in operative position. In the best constructions contemplated the frame includes a pair of rods and a plurality of cross-bars connecting said rods, the slicer unit and table being carried by said bars and one of said rods being provided with a plurality of spaced notches; said means includes a pair of latch pawls adapted to engage said notches when the slicer unit or table is in operative position, respectively, to lock the frame; and said mechanism includes a stationary nut, a screw journaled in one of said cross-bars and threaded into the nut and a hand crank on the screw. These various means and parts may be widely varied in construction for the particular device selected to illustrate the invention is but one of many possible concrete embodiments of the same. The invention, therefore, is not to be restricted to the specific construction shown and described.

Referring to Figs. 1, 2, 3, and 4, the slicer frame 92 is shown supported on cross-bars 100 and 100a, the motor 96 being attached to the bottom of the slicer frame 92. These two cross-bars and a third bar 102a connect the two rods 101 and 101a, forming a frame which is slidably mounted in the main side frames 20 and 21 of the machine. A screw 103, journaled in cross-bar 102a, engages a nut 104 fixed in frame 20 and its opposite end is provided with a hand crank 106. By turning crank 106, Figs. 1 and 2, the frame composed of cross-bars 100, 100a, 102a and rods 101 and 101a, will be made to slide through the bearings in frames 20 and 21, enabling the entire slicer unit to be disassociated from the loaf wrapping and feeding mechanism and to be moved out of operative position to one side of the path of pusher P, as shown in Figs. 3 and 4.

It will be apparent from the foregoing that when the slicer is moved to one side, as shown in Figs. 3 and 4, it will be completely accessible from front and back and above, and it will be a relatively easy matter to get at the same for the purpose of replacing individual broken blades or for detaching the blade carrying frame 352 detachably secured by the bolts 351b and 351d to the reciprocating carrier frames 351 by removing the bolts and pulling the frames horizontally away from the carrier.

A bridge plate 301, attached to lugs projecting from cross-bars 100a and 102, supports a table 302, and while the slicer unit is being moved out of the way the table 302 takes its place and is ready for immediate service as an unsliced loaf transfer. The loaf having been raised to the level of the table of the lifter plate 57, is then transferred across the table 302 by pusher P onto a lifter (not shown) and partially enfolded in a wrapper by mechanism shown in the above mentioned Patent No. 2,082,945. The table 302 is provided with adjustable guide plates 303 which engage the ends of the loaf to guide it while in transit across table 302.

As it is important that the slicer, as well as the table, should be definitely located, a latch is provided which insures accurate alignment of both slicer and table with their respective operating positions. On shaft 304, which is journaled in frames 20 and 21, are two latch pawls 305 and 306. Pawl 305 engages a notch 307 (Fig. 3) in rod 101a when the slicer is in proper registry with its operating position (Fig. 1). At this time pawl 306 has entered a clearance notch 307a in rod 101a. A hand lever 309 on shaft 304 permits the operator to withdraw the pawls from engagement with the notches in rod 101a thus releasing the slicer unit to permit it to be shifted from operative to non-operative position by means of crank 106. When the slicer has been withdrawn and the transfer table is in proper registry with its operating position (Fig. 3) pawl 306 engages a notch 308 in rod 101a. At this time pawl 305 enters a clearance notch 308a.

To insure against accidental injury to operating parts of the machine, while changing the position of the slicer, an electric switch (not shown) connected in the power line supplying power to the main drive of the machine and operated from latch pawl 306, is automatically opened, causing a break in the power line and thus stopping the main drive of the machine. Pawl 306 has a pendant arm 306a (see Fig. 5) to which is connected a rod 310 the free end of which is tapered (see Fig. 3). This taper rides over the push-button 310x of the switch while pawls 305 and 306 are being moved out of their respective notches 307 or 308 and rod 310 advances, thus forcing the button to recede in the switch and establish a break in the power line. After disengaging the pawls from the notches in rod 101a and while turning crank 106, the pawls will rest on top of rod 101a until the notches for the new position are opposite the pawls, whereupon the pawls will slip into the notches under the action of spring 311 interposed between a flange on the rod 310 and a stationary guide for the free end of the latter.

In order to slice loaves of varying lengths, the pusher head P, Fig. 1, must have a width suited to the length of the loaf and the thickness of slices to be cut so as to pass between the slicer blades. A simple and convenient way of building up pusher heads for this purpose is illustrated in Figs. 6 to 10 inclusive. A number of pusher blades 321, the number depending on the length of the loaf and the thickness of slices to be cut are held in slots in clamp plates 322, which in turn are pinned to clamp base 323, and clamped thereto by bolts 324, (see Fig. 8). Clamp base 323 is secured to pusher bracket 325 by means of a bolt 326 having a wing nut 327. When changing to a loaf of a different length it is therefore necessary only to unscrew wing nut 327, detach the head, and replace the pusher head by one having a suitable width and spacing of the pusher blades.

Pusher arm 325 is slidably mounted on two bars 328 and carries a rack 329. Gear 330 on shaft 331 drives the rack 329 and is oscillated by mechanism (not shown) acting on shaft 331, so that the pusher bracket 325 and with it the whole pusher unit will advance and return while the drive gear 330 turns first in one direction and then the other.

The pusher arm is provided with ball races 332 confining balls acting within grooves 333 in bars 328. Two rollers 334, one on each side of pusher bracket 325, bear against the bottom surface of bars 328, thus, in combination with balls in races 332, providing a frictionless bearing for pusher bracket 325 on bars 328.

When the loaves are passed through the machine without being sliced, a simpler pusher unit can be substituted, such as shown in Fig. 3. The details of the same form no part of the present invention so further description thereof is deemed unnecessary.

In order to facilitate adjustments which become necessary when changing from one thickness of slices to another, the two knife frames are so constructed as to be readily removed and replaced by frames with the desired spacing of knives. This arrangement also offers a similar opportunity to quickly change from knives of one shape of cutting edge to a shape more suitable for the kind of bread being run through the machine at the time. The construction employed is shown in Figs. 1 to 4 inclusive. The two knife frame carriers 351 are reciprocably mounted in slicer frame 92 and designed to each support a knife frame 352. Bored lugs 352a at the top corners of each knife frame 352 are bolted to the side of the uprights of the carriers 351 by bolts 351b. At the sides of frame 352, near the bottom, are bored lugs 352b which are bolted to the vertical face of the frame carriers 351 by bolts 351d.

The knife frames 352 have a top member provided with integral lugs 352c slotted to receive the knives K and notched to receive the pins in the upper end of the knives, as shown in Fig. 12. In the bottom member of the knife frames are hinged a corresponding number of small levers 352d having notches fitting the pins in the lower end of knives K. Each lever 352d is backed by a spring 352e, which insures proper tension to the knife blades K and releasably holds them in operative position on the knife frame. The knife frames are provided with a sufficient number of lugs 352c and levers 352d to take care of a loaf of maximum length so that it is necessary to assemble only as many knives K as are required for the different lengths of loaf being run through the machine, if the desired thickness of the slices is unchanged.

It is noted that by making both the pusher head 321 and the blade frames 352 quickly detachable and due to the accessibility made possible by the means for withdrawing the slicer from operating position, it is possible to make all replacements necessary for changing the thickness of the slices simply and rapidly.

What is claimed is:

1. In a bread slicing and wrapping machine, the combination with a pusher adapted to advance a loaf of bread sidewise, of a slidable frame movable transversely of the path of said pusher, and a slicer unit and a table mounted on said frame, whereby either the slicer unit or the table may be moved into operative relation to the loaves advanced by said pusher so that the loaves may be advanced through said unit to be sliced, or across said table without being sliced.

2. In a bread slicing and wrapping machine, the combination with a pusher adapted to advance a loaf of bread sidewise, of a slidable frame movable transversely of the path of said pusher, a slicer unit and a table mounted on said frame, whereby either the slicer unit or the table may be moved into operative relation to the loaves advanced by said pusher, and means for locking said frame with said slicer unit or table in operative position.

3. In a bread slicing and wrapping machine, the combination with a pusher adapted to advance a loaf of bread sidewise, of a slidable frame movable transversely of the path of said pusher, a slicer unit and a table mounted on said frame, whereby either the slicer unit or the table may be moved into operative relation to the loaves advanced by said pusher, and means for locking said frame with said slicer unit or table in operative position, said frame including a pair of rods and a plurality of cross-bars connecting said rods, the slicer unit and table being carried by said bars and one of said bars being provided with a plurality of spaced notches, and said means including a shaft and a pair of latch pawls on said shaft adapted to engage said notches when the slicer unit or table is in operative position, respectively, to lock the frame.

4. In a bread slicing and wrapping machine, the combination with a pusher adapted to advance a loaf of bread sidewise, of a frame movable transversely of the path of said pusher, a slicer unit and a table mounted on said frame, mechanism for moving said frame, whereby either the slicer unit or the table may be moved into operative relation to the loaves advanced by the pusher, and means for locking said frame with the slicer unit or table in operative position.

5. In a bread slicing and wrapping machine, the combination with a pusher adapted to advance a loaf of bread sidewise, of a frame movable transversely of the path of said pusher, a slicer unit and a table mounted on said frame, mechanism for moving said frame, whereby either the slicer unit or the table may be moved into operative relation to the loaves advanced by the pusher, and means for locking said frame with the slicer unit or table in operative position, said frame including a pair of rods and a plurality of cross-bars connecting said rods, the slicer unit and table being carried by said bars and one of said rods being provided with a plurality of spaced notches, and said means including a pair of latch pawls adapted to engage said notches when the slicer unit or table is in operative position, respectively, to lock the frame.

6. In a bread slicing and wrapping machine, the combination with a pusher adapted to advance a loaf of bread sidewise, of a frame movable transversely of the path of said pusher, a slicer unit and a table mounted on said frame, mechanism for moving said frame, whereby either the slicer unit or the table may be moved into operative relation to the loaves advanced by the pusher, and means for locking said frame with the slicer unit or table in operative position, said frame including a pair of rods and a plurality of cross-bars connecting said rods, the slicer unit and table being carried by said bars, and said mechanism including a stationary nut, a screw journaled in one of said cross-bars and threaded into said nut, and a hand crank on said screw.

7. In a bread slicing and wrapping machine, the combination with a pusher adapted to advance a loaf of bread sidewise, of a frame movable transversely of the path of said pusher, a slicer unit and a table mounted on said frame, mechanism for moving said frame, whereby the slicer unit or the table may be moved into operative relation to the loaves advanced by the pusher, and means for automatically locking said frame with the slicer unit or table in operative position.

8. In a bread slicing and wrapping machine, the combination with a pusher adapted to advance a loaf of bread sidewise, of a frame movable transversely of the path of said pusher, a slicer unit and a table mounted on said frame, mechanism for moving said frame, whereby the slicer unit or the table may be moved into operative relation to the loaves advanced by the pusher, and means for automatically locking said frame with the slicer unit or table in operative position, said frame including a pair of rods and a plurality of cross-bars connecting said rods, the slicer unit and table being carried by said bars and one of said rods being provided with a plurality of spaced notches, and said means including a shaft, a pair of latch pawls on said shaft adapted to engage said notches when the slicer unit or table is in operative position, respectively, and a spring urging said pawls against the notched rod.

9. In a bread slicing and wrapping machine, the combination with a pusher adapted to advance a loaf of bread sidewise, of a frame movable transversely of the path of said pusher, a slicer unit and a table mounted on said frame, mechanism for moving said frame, whereby the slicer unit or the table may be moved into operative relation to the loaves advanced by the pusher, and means for automatically locking same frame with the slicer unit or table in operative position, said frame including a pair of rods and a plurality of crossbars connecting said rods, the slicer unit and table being carried by said bars and one of said rods being provided with a plurality of spaced notches, and said means including a shaft, a latch pawl mounted on said shaft and having a pendant arm, a spring-pressed rod connected to said arm to cause said pawl to enter one of said notches when the slicer unit or table is in operative position, respectively, and a hand lever on said shaft for turning the latter to withdraw the pawl from the notch.

10. In a bread slicing and wrapping machine, the combination with a pusher adapted to advance a loaf of bread sidewise, of a frame movable transversely of the path of said pusher, a slicer unit and a table mounted on said frame, mechanism for moving said frame, whereby the slicer unit or the table may be moved into operative relation to the loaves advanced by the pusher, and means for automatically locking said frame with the slicer unit or table in operative position, said pusher including a pair of spaced bars, a pusher arm slidably mounted on said bars, a pusher head removably secured to said arm, a plurality of spaced vertically disposed blades mounted in said head, and means for clamping the blades in said head.

11. In a bread slicing and wrapping machine, the combination with a pusher adapted to advance a loaf of bread sidewise, of a frame movable transversely of the path of the pusher, a slicer unit and a table mounted on said frame, mechanism for moving said frame, whereby the slicer unit or the table may be moved into operative relation to the loaves advanced by the pusher, means for locking said frame with the slicer unit or the table in operative position, and an electric switch adapted to be connected in the power line of the machine, said frame including a pair of rods and a plurality of cross-bars connecting said rods, the slicer unit and table being carried by said bars and one of said rods being provided with a plurality of spaced notches, and said means including a shaft, a latch pawl mounted on said shaft and having a pendant arm, a spring-pressed rod having a tapered end and having its other end connected to said arm to cause said pawl to enter one of said notches when the slicer unit or the table is in operative position, respectively, and a hand lever on said shaft for turning the latter to withdraw the pawl from the notch, and said electric switch having a push-button disposed in the path of the taper on said spring-pressed rod, whereby the push button will be depressed and the switch will be opened while the pawl is being withdrawn from the notch.

12. In a bread slicing and wrapping machine, the combination with a pusher adapted to advance a loaf of bread sidewise, of a frame movable transversely of the path of said pusher, a slicer unit and a table mounted on said frame, means for locking said frame with the slicer unit or the table in operative position, and an electric switch controlled by said means and adapted to be connected in the power line of the main drive of the machine and be opened whenever said frame is released from said locking means.

13. In a bread slicing and wrapping machine, the combination with a wrapping machine pusher adapted to advance loaves, of a slicer unit comprising a reciprocating carrier frame, a blade frame detachably secured to said carrier frame, and movable slidingly relatively thereto for slicing a loaf, said blade frame having a plurality of slicing blades secured to it, and means for moving said slicer unit bodily horizontally into position to slice loaves advanced by said pusher and out of said position and to one side of the path of said pusher to a position more accessible for detaching said blade frame.

14. In a bread slicing and wrapping machine, the combination with a traveling element adapted to advance a loaf of bread sidewise, of a frame movable into and out of the path of said element, a slicer unit on said frame, said frame having a table to support the loaves during the slicing operation, and movable therewith into and out of said path, and an auxiliary table movable into operative relation to the loaves advanced by said element when said slicer unit is moved with said frame out of the path of said element.

15. A bread slicing and wrapping machine having the features claimed in claim 4, in which means are provided to bias said locking means normally toward locking position, and means are provided to incapacitate said locking means at will.

16. In a bread slicing and wrapping machine, the combination with a pusher adapted to advance a loaf of bread sidewise, of a slidable frame movable transversely of the path of said pusher, a slicer unit and a table mounted in spaced relation on said frame, and mechanism for moving said frame, said mechanism being so constructed and arranged that either the slicer unit or the table may be positioned in operative relation to the loaves advanced by the pusher, said pusher including, a pair of spaced bars, a pusher arm slidably mounted on said bars, a pusher head removably secured to said arm, a plurality of spaced vertically disposed blades mounted in said head, and means for clamping the blades in said head.

LESTER FERENCI.